United States Patent
Tokudome et al.

(10) Patent No.: US 10,173,199 B2
(45) Date of Patent: Jan. 8, 2019

(54) PHOTOCATALYST COMPOSITE PARTICLES AND METHOD FOR PRODUCING SAME

(71) Applicants: TOTO LTD., Kitakyushu-shi, Fukuoka (JP); Japan Technological Research Association of Artificial Photosynthesis Chemical Process, Chiyoda-ku, Tokyo (JP)

(72) Inventors: Hiromasa Tokudome, Kitakyushu (JP); Sayuri Okunaka, Kitakyushu (JP)

(73) Assignees: Toto Ltd., Fukuoka (JP); Japan Technological Research Association of Artificial Photosynthesis Chemical Process, Tokyo (JP)

( * ) Notice: Subject to any disclaimer, the term of this patent is extended or adjusted under 35 U.S.C. 154(b) by 0 days.

(21) Appl. No.: 15/522,148

(22) PCT Filed: Sep. 30, 2015

(86) PCT No.: PCT/JP2015/077837
§ 371 (c)(1),
(2) Date: Apr. 26, 2017

(87) PCT Pub. No.: WO2016/067823
PCT Pub. Date: May 6, 2016

(65) Prior Publication Data
US 2017/0326531 A1 Nov. 16, 2017

(30) Foreign Application Priority Data

Oct. 28, 2014 (JP) ................................ 2014-219573
Sep. 4, 2015 (JP) ................................ 2015-175009

(51) Int. Cl.
*B01J 21/06* (2006.01)
*B01D 53/88* (2006.01)
*B01J 35/00* (2006.01)
*B01J 37/02* (2006.01)
*C02F 1/48* (2006.01)
*C02F 1/72* (2006.01)
*B01J 37/03* (2006.01)
*B01J 37/04* (2006.01)
*B01J 37/08* (2006.01)
*B01J 23/00* (2006.01)
*B01J 23/10* (2006.01)
*B01J 27/24* (2006.01)
*B01J 37/00* (2006.01)
*C01B 3/04* (2006.01)

(52) U.S. Cl.
CPC .......... *B01J 21/063* (2013.01); *B01D 53/885* (2013.01); *B01J 21/066* (2013.01); *B01J 23/002* (2013.01); *B01J 23/10* (2013.01); *B01J 27/24* (2013.01); *B01J 35/004* (2013.01); *B01J 35/0033* (2013.01); *B01J 37/0036* (2013.01); *B01J 37/023* (2013.01); *B01J 37/0219* (2013.01); *B01J 37/0221* (2013.01); *B01J 37/0244* (2013.01); *B01J 37/031* (2013.01); *B01J 37/04* (2013.01); *B01J 37/082* (2013.01); *B01J 37/088* (2013.01); *C01B 3/04* (2013.01); *C02F 1/48* (2013.01); *C02F 1/725* (2013.01); *Y02E 60/364* (2013.01)

(58) Field of Classification Search
CPC ........ B01J 21/063; B01J 21/066; B01J 27/24; B01J 31/0257; B01J 35/0033; B01J 35/004; B01J 37/0221; B01J 37/0244; B01D 53/885; C02F 1/48; C02F 1/725
USPC ................. 502/200, 208; 106/287.3, 287.38
See application file for complete search history.

(56) References Cited

U.S. PATENT DOCUMENTS

| | | | |
|---|---|---|---|
| 2001/0046944 A1 | 11/2001 | Ito et al. | |
| 2002/0151434 A1 | 10/2002 | Domen et al. | |
| 2004/0067849 A1 | 4/2004 | Tanaka et al. | |
| 2004/0245496 A1* | 12/2004 | Taoda ................. | C11D 3/0063 252/186.1 |

(Continued)

FOREIGN PATENT DOCUMENTS

| | | | |
|---|---|---|---|
| EP | 1 147 812 A1 | 10/2001 | |
| EP | 1 314 477 A1 | 5/2003 | |
| EP | 1 462 169 A1 | 9/2004 | |

(Continued)

OTHER PUBLICATIONS

"Recent progress in the development of (oxy)nitride photocatalysts for water splitting under visible-light irradiation," Yosuke Moriya et al. Coordination Chemistry Reviews 257 (2013), pp. 1957-1969.*

(Continued)

*Primary Examiner* — Patricia L. Hailey
(74) *Attorney, Agent, or Firm* — Carrier Blackman & Associates, P.C.; Joseph P. Carrier; Jingli Wang

(57) ABSTRACT

Disclosed are metal nitride photocatalyst particles and/or metal oxynitride photocatalyst particles having high dispersibility. The metal nitride photocatalyst particles and/or metal oxynitride photocatalyst particles having high dispersibility can be obtained by containing metal nitride photocatalyst particles and/or metal oxynitride photocatalyst particles, which are capable of splitting water under visible light irradiation, and a phosphoric acid polymer that is adsorbed on the surface of the particles. Further, because these particles have high photocatalytic activity under visible light irradiation, splitting water by using these particles can generate hydrogen and/or oxygen with high efficiency.

20 Claims, No Drawings

(56) References Cited

U.S. PATENT DOCUMENTS

2015/0251172 A1* 9/2015 Tokudome .......... C01B 13/0207
428/323

FOREIGN PATENT DOCUMENTS

| JP | 2002-001125 | * | 1/2002 | ............ B01J 35/002 |
| JP | 2005-154513 | * | 6/2005 | .............. B01J 27/16 |
| JP | 2005-171029 | * | 6/2005 | .............. B01J 35/02 |
| JP | 2006-008902 | * | 1/2006 | ............... A61L 9/00 |
| JP | 2012-187520 | * | 10/2012 | .............. B01J 27/24 |
| WO | 2005/014170 A1 | | 2/2005 | |
| WO | 2014/017575 A1 | | 1/2014 | |

OTHER PUBLICATIONS

"Low-reflective and super-hydrophilic properties of titanate or titania nanotube thin films via layer-by-layer assembly," Masahiro Miyauchi et al. Thin Solid Films 515 (2006), pp. 2091-2096.*
Extended European search report dated Jun. 7, 2018, issued in the corresponding EP Patent Application 15854603.6.

* cited by examiner

PHOTOCATALYST COMPOSITE PARTICLES AND METHOD FOR PRODUCING SAME

FIELD OF INVENTION

The present invention relates to photocatalyst composite particles and a method for producing the same.

BACKGROUND ART

Visible light responsive photocatalysts are expected to be applied, as photocatalysts which can utilize visible light which is contained in large amount in sunlight, to photodecomposition of organic substances and production of hydrogen by photolysis of water. Especially, photocatalysts for splitting water to produce hydrogen have drawn attention as photocatalysts used for a generation method for hydrogen by utilizing a renewable energy. Consequently, the demand for photocatalysts for splitting water having a high activity has increased year after year.

A photocatalyst consisting of a metal nitride containing a metal and nitrogen in the crystal lattice thereof, or a photocatalyst consisting of a metal oxynitride containing a metal, oxygen, and nitrogen in the crystal lattice thereof is known as a visible light responsive photocatalyst having high activity for splitting water (see, for example, Patent Literature 1 and Non Patent Literature 1).

CITATION LIST

Patent Literature

[PTL 1] JP 2002-066333A

Non-Patent Literature

NPL 1] J. Phys. Chem. Lett., 2010, 1(18), pp 2655-2661

SUMMARY OF THE INVENTION

Metal nitride photocatalyst particles and/or metal oxynitride photocatalyst particles are usually prepared by heating metal oxide photocatalyst particles at high temperature in a stream of ammonia. The resulting metal nitride photocatalyst particles and/or metal oxynitride photocatalyst particles exist as secondary particles formed by fusion and strong aggregation of primary particles due to change of crystal structure from an oxide to a nitride and/or an oxynitride. For this reason, contact of active sites for the photocatalytic reaction, which are present on the surface of the primary particles, with water becomes insufficient, and there has been a tendency that efficiency of water splitting reaction deteriorates. Further, when the primary particles have aggregated to form huge secondary particles having a diameter of 5 μm or more, light scattering on the surface of the secondary particles becomes significant and, thereby, there have also been possibilities that effective light absorption inside the metal nitride photocatalyst particles and/or metal oxynitride photocatalyst particles is inhibited.

The present invention has been made in light of such problems, and aims to provide metal nitride photocatalyst particles and/or metal oxynitride photocatalyst particles having high dispersibility.

The present invention relates to photocatalyst composite particles comprising: metal nitride photocatalyst particles and/or metal oxynitride photocatalyst particles, which are capable of splitting water under visible light irradiation; and a phosphoric acid polymer that is adsorbed on the surface of the particles.

According to the present invention, metal nitride photocatalyst particles and/or metal oxynitride photocatalyst particles having high dispersibility can be obtained. Furthermore, splitting water by using the photocatalyst composite particles according to the present invention under visible light irradiation can generate hydrogen and/or oxygen with high efficiency.

DESCRIPTION OF THE INVENTION

Metal Nitride Photocatalyst Particles and/or Metal Oxynitride Photocatalyst Particles The metal nitride photocatalyst particles and/or metal oxynitride photocatalyst particles in the present invention can, upon absorption of visible light, generate hydrogen and/or oxygen by splitting water. Further, a phosphoric acid polymer, which will be described later, is adsorbed on the surface of the metal nitride photocatalyst particles and/or metal oxynitride photocatalyst particles. Hereinafter, in the present specification, the "metal nitride photocatalyst particles and/or metal oxynitride photocatalyst particles" are referred to simply as the "photocatalyst particles."

The photocatalyst particles in the present invention show properties of a semiconductor having an optical band gap. In addition, electron transfer such as interband transition and the like by absorbing light including visible light having wavelength of 420 nm or more leads to the production of excited electrons in a conduction band (or electron acceptor level present within the band gap) and the production of excited holes in a valence band (or electron donor level present within the band gap). Hereby, the photocatalyst particles in the present invention can reduce or oxidize a reaction object.

In the present invention, "splitting water" means the following reactions. When the conduction band of the photocatalyst particles is located at a negative position relative to the reduction potential of water (0 V vs. NHE (standard hydrogen electrode potential), pH=0), the photocatalyst particles can reduce water to generate hydrogen. When the valence band of the photocatalyst particles is located at a positive position relative to the oxidation potential of water (1.23 V vs. NHE (standard hydrogen electrode potential), pH=0), the photocatalyst particles can oxidize water to generate oxygen. The photocatalyst particles in the present invention may be those having a conduction band and/or a valence band, which are capable of reducing and/or oxidizing water.

In the present invention, the metal nitride photocatalyst particles are photocatalyst particles comprising a metal nitride containing a metal and nitrogen. Furthermore, the metal oxynitride photocatalyst particles are photocatalyst particles comprising a metal oxynitride containing a metal, oxygen, and nitrogen. These photocatalyst particles are capable of splitting water by absorbing visible light.

The metal contained in the photocatalyst particles in the present invention includes titanium, niobium, tantalum, zirconium, zinc, gallium, indium, and the like. As the photocatalyst particles, it is preferable to use one or more selected from metal oxynitrides having a perovskite structure, TaON, NbON, $Ta_3N_5$, $Nb_3N_5$, and $Ga_{1-x}Zn_xO_xN_{1-x}$ (x: a real number in a range of 0<x<1). Further, it is more preferable to use one or more selected from $LaTiO_2N$, $CaTaO_2N$, $SrTaO_2N$, $BaTaO_2N$, $CaNbO_2N$, $SrNbO_2N$, $BaNbO_2N$, $LaTaON_2$, LaNbON$_2$, LaTa$_{2/3}$Mg$_{1/3}$O$_2$N, TaON, Ta$_3$N$_5$, and Ga$_{1-x}$Zn$_x$O$_x$N$_{1-x}$ (x: a real number in a range of 0<x<1).

The photocatalyst particles in the present invention may be those having conductivity, light absorption characteristics, and the like thereof changed by substitution of cation sites, where metal ions contained in the above photocatalyst particles are disposed, with different metals or lattice defects, or by introduction of different metals or lattice defects into the cation sites. Alternatively, the photocatalyst particles in the present invention may be those having conductivity thereof changed by introduction of different anions or lattice defects into anion sites, where oxygen ions or nitrogen ions contained in the above photocatalyst particles are disposed.

Characteristics of an electronic structure which allow the photocatalyst particles in the present invention to exhibit visible light responsiveness include, for example, that the valence band is formed by orbitals derived mainly from nitrogen or by hybridization of orbitals derived from oxygen and orbitals derived from nitrogen, and that the conduction band is formed by orbitals derived mainly from a metal(s). A band gap can be reduced by adding a nitrogen atom which forms electron orbitals at a more negative position than an oxygen atom, in the orbitals which form the valence band. Accordingly, because the photocatalyst particles in the present invention realize a relatively small band gap (1.5 to 2.8 eV) while having a valence band position at a positive voltage relative to the oxidation potential of water (±1.23 V. vs. NHE at pH=0), it they can respond to visible light.

The primary particle diameter of the photocatalyst particles in the present invention is not particularly limited but is preferably 2 nm or more to 5 µm or less, more preferably 10 nm or more to 2 µm or less, even more preferably 30 nm or more to 1 µm or less, and still even more preferably 50 nm or more to 500 nm or less. Hereby, when the photocatalyst particles are dispersed in a liquid, especially in water, a stable dispersion state of the photocatalyst particles can be maintained. Therefore, the photocatalyst particles have an increased surface area in which the particles are in contact with water. Further, the number of hydrogen generating reaction sites by reducing water, or the number of oxygen generating reaction sites by oxidizing water is increased, and, consequently, the photocatalysis can be promoted with high efficiency. Furthermore, by irradiating such photocatalyst particles with visible light, the distance of diffusion of excited electrons and excited holes produced within the particles from the inside of the particles to the surface of the particles becomes short. Thus, a reaction for generating hydrogen by reducing water or a reaction for generating oxygen by oxidizing water can high-efficiently occur at the surface of the particles with the exited electrons and the exited holes each diffused thereto.

As for the primary particle diameter of the photocatalyst particles in the present invention, the particles are observed by a scanning electron microscope (for example, "SU-8020" manufactured by Hitachi, Ltd. Hereinafter, may be referred to as "SEM") at a magnification of 20000 times, and an average value of diameters of 50 crystal particles can be used as the primary particle diameter, the diameters being approximated by a circle.

Phosphoric Acid Polymer

The phosphoric acid polymer used in the present invention is one in which phosphoric acids are polymerized. Preferable is an oligomer in which phosphoric acids are polymerized. The mode of polymerization of phosphoric acids includes linear polymerization, cyclic polymerization, and branched polymerization. In the phosphoric acid polymer in the present invention, the number of phosphoric acids polymerized, that is the number of phosphoric acid units, is preferably 2 or more to 30 or less, more preferably 3 or more to 10 or less, and even more preferably 3 or more to 6 or less. Specifically, phosphoric acid polymers having low molecular weight such as tripolyphosphoric acid in which three phosphoric acid molecules are polymerized, hexametaphosphoric acid in which six phosphoric acid molecules are polymerized, and the like are preferably can be used. Hereby, the phosphoric acid polymer can be adsorbed on the surface of the photocatalyst particles as a monomolecular layer, and, in photocatalyst composite particles which will be described later, deterioration of photocatalytic activity possessed by the photocatalyst particles can be suppressed. Furthermore, because phosphoric acid contained in the phosphoric acid polymer has anionicity, the phosphoric acid polymer may contain alkali metal ions (Li$^+$, Na$^+$, K$^+$, and Cs$^+$) as counter ions.

Photocatalyst Composite Particles

The photocatalyst composite particles of the present invention comprise metal nitride photocatalyst particles and/or metal oxynitride photocatalyst particles, and a phosphoric acid polymer that is adsorbed on the surface of the photocatalyst particles. The photocatalyst composite particles of the present invention with a phosphoric acid polymer adsorbed on the surface of the photocatalyst particles have high dispersibility. Here, a form of the photocatalyst particles can be a primary particle composed of single crystal, or secondary particle formed by aggregation of a plurality of the primary particles. In the present invention, the form of the photocatalyst particles is preferably a primary particle composed of single crystal. Hereby, in the photocatalyst particles, the surface area having photocatalytic activity can be increased. When the form of the photocatalyst particles is a secondary particle, the number of primary particles which form the secondary particle is preferably 2 or more to 20 or less, more preferably 2 or more to 10 or less, and even more preferably 2 or more to 5 or less. A particle diameter of the secondary particle is preferably 30 nm or more to 1 µm or less, and more preferably 50 nm or more to 500 nm or less. For this reason, when the photocatalyst particles are dispersed in a solvent, especially in water, a stable dispersion state of the photocatalyst particles can be maintained.

In the present invention, a phosphoric acid polymer that is adsorbed on the surface of the photocatalyst particles means that the phosphoric acid polymer is bound to a portion of the surface of the photocatalyst particles. The photocatalyst composite particles of the present invention are provided with negative charges of the phosphoric acid polymer on the surface of the photocatalyst particles, and, therefore, electrostatic repulsion occurs among the photocatalyst particles. Hereby, the photocatalyst composite particles can be dispersed stably in a solution. In the present invention, the phosphoric acid polymer has a plurality of phosphoric acid units. The photocatalyst particles bind to the phosphoric acid polymer through phosphorus in the phosphoric acid unit. Therefore, the photocatalyst particles and the phosphoric acid polymer are bound at a plurality of locations. For this reason, adsorption between the photocatalyst particles and the phosphoric acid polymer can be made stronger. In addition, in an aqueous solution, desorption of the phosphoric acid polymer from the photocatalyst particles can be made difficult to occur. Furthermore, the phosphoric acid polymer can be adsorbed on the surface of the photocatalyst particles as a monomolecular layer. Hereby, an influence of the phosphoric acid polymer disposed on the surface of the photocatalyst particles to block light irradiation onto the photocatalyst particles can be reduced and, thus, in the photocatalyst composite particles, deterioration of photocatalytic activity possessed by the photocatalyst particles can be suppressed.

In the present invention, a state of bonding between the photocatalyst particle and the phosphoric acid polymer may be either physical adsorption or chemical bonding. Preferable is the chemical bonding. The chemical bonding includes an ester bond, an ionic bond (electrostatic adsorption), a hydrogen bond, or the like. For example, the photocatalyst particle and the phosphoric acid polymer are chemically bound to each other and, for example, the phosphoric acid polymer is bound to the surface of the photocatalyst particle through an ester bond. In this case, denticity of oxygen which is bound to phosphorus in the phosphoric acid unit to a metal atom which is present on the surface of the photocatalyst particle may be 1 (monodentate), 2 (bidentate), or 3 (tridentate). By such chemical bonds, the phosphoric acid polymer well adsorbed on the surface of the photocatalyst particle. Furthermore, the phosphoric acid unit has a high tendency to exhibit anionicity, and therefore, when the surface of the photocatalyst particle has cationicity, the photocatalyst particle and the phosphoric acid polymer can be bound to each other through a strong ionic bond due to Coulomb interaction.

In the present invention, the state of bonding between the photocatalyst particle and the phosphoric acid polymer can be evaluated by $^{31}$P-NMR measurement and infrared spectrometry. As an evaluation method using the $^{31}$P-NMR measurement, a signal position of $^{31}$P derived from a phosphoric acid polymer as a raw material and a signal position of $^{31}$P derived from a phosphoric acid polymer adsorbed on the photocatalyst particle are compared to each other by using a NMR measuring device (for example, "ASX-400" manufactured by Bruker Corporation). When the signal position of $^{31}$P derived from the phosphoric acid polymer adsorbed on the photocatalyst particle is shifted to a lower frequency side, it can be found that the phosphoric acid polymer is adsorbed on the photocatalyst particle through an ester bond. Further, depending on an amount of shift change in the signal position, it is possible to determine which of monodentate, bidentate, and tridentate coordination the bonding mode is derived from. As a measuring method using the infrared spectrometry, a peak corresponding to a symmetric or asymmetric stretching vibration of a P—O bond derived from a phosphoric acid polymer as a raw material and a peak corresponding to a symmetric or asymmetric stretching vibration of a P—O bond derived from a phosphoric acid polymer adsorbed on the photocatalyst particle are compared to each other by ATR-FT-IR, namely Attenuated Total Reflection Fourier Transform Infrared spectrometry. When the peak corresponding to a symmetric or asymmetric stretching vibration of a P—O bond derived from the phosphoric acid polymer adsorbed on the photocatalyst particle is shifted to a lower wave number side, it can be found that the phosphoric acid polymer is adsorbed on the photocatalyst particle through an ester bond. Further, by evaluating a shift amount in the wave number and a level of peak intensity, it is possible to determine which of monodentate, bidentate, and tridentate coordination the bonding mode is derived from.

In the photocatalyst composite particles of the present invention, a weight ratio of the photocatalyst particles to the phosphoric acid polymer, represented by the photocatalyst particles: the phosphoric acid polymer, though it depends on the particle diameter of the photocatalyst particles, is preferably 1:0.0001 or more to 1:0.5 or less, more preferably 1:0.001 or more to 1:0.3 or less, even more preferably 1:0.005 or more to 1:0.3 or less, and still even more preferably 1:0.005 or more to 1:0.2 or less. Hereby, the surface of the photocatalyst particles can be provided with anionicity. Therefore, in polar solvent having various pH values, especially in an aqueous solution, the photocatalyst composite particles can be dispersed stably due to electrostatic repulsion among the particles caused by negative charges on the surface thereof.

An average particle diameter of the photocatalyst composite particles of the present invention is preferably about the same as the primary particle diameter of the photocatalyst particles contained in the photocatalyst composite particles. Specifically, the average particle diameter of the photocatalyst composite particles is preferably 2 nm or more to 5 μm or less, more preferably 10 nm or more to 2 μm or less, even more preferably 30 nm or more to 1 μm or less, and still even more preferably 50 nm or more to 500 nm or less. An effect obtained by this is the same as the effect obtained when the primary particle diameter of the photocatalyst particles is in the above prescribed range. In the present invention, as for the average particle diameter of the photocatalyst composite particles, the particles are observed by a SEM at a magnification of 20000 times, and an average value of diameters of 50 crystal particles can be used as the average particle diameter, the diameters being approximated by a circle. Alternatively, a scattering intensity distribution is obtained by evaluating a dispersion containing 1% by mass of the photocatalyst composite particles by using a dynamic light scattering-type particle size analyzer (for example, ELSZ-1000 manufactured by Otsuka Electronics Co., Ltd.). An average particle diameter obtained from this scattering intensity distribution by a Cumulant method can be used.

Defects in Photocatalyst Composite Particles

The photocatalyst composite particles of the present invention preferably have few oxygen or nitrogen defects on the surface thereof. That is, in the present invention, a ratio of $A_{surface}/A_{bulk}$ is preferably 0.8 or more to 1.2 or less, where $A_{surface}$ is an atomic concentration ratio on the surface of the photocatalyst composite particles, and is represented by (nitrogen atom concentration)/(nitrogen atom concentration+oxygen atom concentration), and $A_{bulk}$ is an atomic concentration ratio inside the photocatalyst composite particles, and is represented by (nitrogen atom concentration)/(nitrogen atom concentration+oxygen atom concentration). $A_{surface}/A_{bulk}$ is more preferably 0.9 or more to 1.1 or less, and even more preferably 0.9 or more to 1.0 or less. When there are few oxygen or nitrogen defects on the surface of the photocatalyst composite particles, light absorption in a near-infrared region resulting from crystal defects can be reduced. Furthermore, good photocatalytic activity can be maintained.

The atomic concentration of nitrogen and oxygen on the surface of the photocatalyst composite particles can be obtained by X-ray photoelectron spectrometry (XPS). Here, with regard to peaks by XPS, when several kinds of peaks are observed to be overlapped with each other, peak separation processing by fitting may be performed. According to evaluation by XPS, photoelectrons from nitrogen and oxygen which exist at a depth of several nanometers from the outermost surface of a crystal can be generally detected. Therefore, based on the detection of photoelectrons in a region at a depth of several nanometers from the surface, atomic concentration of nitrogen and oxygen on the surface of the photoelectron composite particles can be obtained. In order to measure the atomic concentration of nitrogen and oxygen in the present invention, an XPS measuring apparatus (for example, "PHI Quantera II," manufactured by ULVAC-PHI, Inc., X-ray source: monochromatic Al Kα (1486.6 eV)) can be used. By evaluating the region at a depth of several nanometers (for example, 2 to 3 nm) from the surface of the photocatalyst composite particles without etching them, a photoelectron peak(s) of each element contained in this region can be obtained. This photoelectron peak(s) represents binding energy in XPS. In the photoelectron peak(s) obtained, when several kinds of peaks are overlapped with each other, peak separation processing by fitting may be performed. By comparison of integrated intensity obtained from a narrow spectrum(s) in the vicinity of a photoelectron peak(s) of each element, an atomic concentration of each element can be calculated.

As peaks of oxygen atoms, there are a peak(s) of an oxygen atom (carbon-oxygen double bond, carbon-oxygen single bond, and the like) derived from organic materials such as pollution adhering to the surface of the photocatalyst composite particles, and a peak(s) of an oxygen atom which is bound to a metal (O-metal) in the oxygen 1s orbital. Among these, in order to measure the oxygen atomic concentration in the present invention, integrated intensity of a peak (pK1, binding energy: about 529 eV) derived from the oxygen atom which is bound to metal (O-metal) in the oxygen 1s orbital can be used. In order to measure the nitrogen atomic concentration, integrated intensity of a peak (pK1, binding energy: about 395 eV) derived from the nitrogen atom which is bound to a metal in the nitrogen 1s orbital can be used.

Atomic concentration of nitrogen and oxygen inside the photocatalyst composite particles can also be obtained by XPS. Based on the detection of photoelectrons in a region at a depth of about 10 nm from the surface, which is made possible by etching the surface of the photocatalyst composite particles with Ar and the like, atomic concentration of nitrogen and oxygen inside the photocatalyst composite particles can be obtained.

In the present invention, an atomic concentration of nitrogen and oxygen which is obtained by evaluating a region at a depth of several nanometers from the surface of the photocatalyst particles by XPS without etching the surface of the photocatalyst particles having no phosphoric acid polymer adsorbed thereon, can be used as the atomic concentration of nitrogen and oxygen inside the photocatalyst composite particles. It is considered that only the concentration of an atom(s) in the vicinity of the surface of the photocatalyst composite particles is affected by adsorption of the phosphoric acid polymer. That is, it is considered that the atomic concentration of nitrogen and oxygen inside the photocatalyst composite particles is not affected by adsorption of the phosphoric acid polymer. Therefore, the atomic concentration of nitrogen and oxygen inside the photocatalyst composite particles is considered to be equal to the atomic concentration of nitrogen and oxygen on the surface of the photocatalyst particles having no phosphoric acid polymer adsorbed thereon. From the above, the atomic concentration of nitrogen and oxygen on the surface of the photocatalyst particles having no phosphoric acid polymer adsorbed thereon can be used as the atomic concentration of nitrogen and oxygen inside the photocatalyst composite particles.

An atomic concentration of phosphorus on the surface of the photocatalyst composite particles in the present invention can also be obtained by XPS. Here, because phosphorus in the present invention exists in a state of phosphoric acid, integrated intensity of an XPS peak derived from phosphoric acid (pK1, binding energy: about 133 eV) can be used, as the atomic concentration of phosphorous. The atomic concentration ratio in the present invention, represented by (phosphorus atomic concentration)/(phosphorus atomic concentration+nitrogen atomic concentration), is preferably 0.1 or more to 1 or less.

Supporting Co-Catalyst on Photocatalyst Composite Particles

The photocatalyst composite particles of the present invention preferably support a co-catalyst. As the co-catalyst used in the present invention, preferable are those which can efficiently promote a reaction of splitting water under visible light irradiation. Furthermore, preferable are those which can improve generation efficiency of hydrogen and/or oxygen by decreasing a reaction overpotential(s) in a reaction of generating hydrogen by reduction of water and/or in a reaction of generating oxygen by oxidation of water. Supporting a co-catalyst allows the water-splitting reaction under visible light irradiation to be efficiently promoted. Specifically, co-catalysts which make the hydrogen generating reaction by reduction of water highly efficient include one or more selected from the group consisting of platinum, ruthenium, rhodium, silver, gold, ruthenium oxide, rhodium oxide, molybdenum sulfide, nickel sulfide, and tungsten sulfide. Co-catalysts which make the oxygen generating reaction by oxidation of water highly efficient include any one or more of oxides, hydroxides, or phosphates, which contain at least one selected from the group consisting of nickel, manganese, ruthenium, cobalt, and iridium. A particle diameter of the co-catalyst is preferably 0.5 nm or more to 50 nm or less, and more preferably 0.5 nm or more to 20 nm or less. The particle diameter of the co-catalyst can be obtained by determining an average value of particle diameters of 10 co-catalyst, the diameters being measured by transmission electron microscopy (TEM) observation. An amount of the co-catalyst supported is, when weight of the photocatalyst composite particles is set to be 1, preferably 0.0001 or more to 0.1 or less, more preferably 0.001 or more to 0.05 or less, and even more preferably 0.005 or more to 0.03 or less. When the particle diameter and the amount of the co-catalyst are in the above ranges, light absorption by the co-catalyst can be suppressed, and the co-catalyst can be well dispersed and then supported on the surface of the photocatalyst composite particles. Further, it allows the surface of the photocatalyst composite particles to have many active sites for water-splitting reaction.

In the present invention, as a method for supporting a co-catalyst on the photocatalyst composite particles, a wet reaction method and a dry reaction method can be used. The wet reaction method includes an impregnation method, a photo-reduction method, a chemical reduction method, an adsorption method, and the like. The dry reaction method includes an atomic layer deposition method, a sputtering method, a vapor deposition method, and the like. In the present invention, the co-catalyst may be supported on the surface of the photocatalyst particles having the phosphoric acid polymer adsorbed thereon, or the phosphoric acid polymer may be adsorbed on the surface of the photocatalyst particles having the co-catalyst supported thereon.

For example, when the co-catalyst is supported by a wet reaction method on the surface of the photocatalyst particles having the phosphoric acid polymer adsorbed thereon, the photocatalyst particles having the phosphoric acid polymer adsorbed thereon are immersed in a solution containing metal ions which become a raw material of the co-catalyst or fine particles of the co-catalyst. In this case, the metal ions which become a raw material of the co-catalyst or fine particles of the co-catalyst can uniformly adsorb to phosphate groups present on the surface of the photocatalyst particles through ionic bond (electrostatic adsorption) or ester bond. In the case of the impregnation method, the photocatalyst particles having the phosphoric acid polymer adsorbed thereon are immersed in a solution containing metal ions which become a raw material of the co-catalyst or fine particles of the co-catalyst, and are thereafter dried and fired. In the case of the photo-reduction method, the photocatalyst particles having the phosphoric acid polymer adsorbed thereon are immersed in a solution containing metal ions which become a raw material of the co-catalyst or fine particles of the co-catalyst and, thereafter, are subjected to reduction under light irradiation. In the case of the chemical reduction method, the photocatalyst particles having the phosphoric acid polymer adsorbed thereon are immersed in a solution containing metal ions which become a raw material of the co-catalyst or fine particles of the co-catalyst and, thereafter, are subjected to reduction by a chemical reducing agent. Hereby, the co-catalyst can be supported uniformly and in a highly dispersed state on the surface of the photocatalyst particles having the phosphoric acid polymer adsorbed thereon. In the case of the adsorption method, drying the particles obtained after immersion allows the co-catalyst to be supported uniformly on the surface of the photocatalyst particles having the phosphoric acid polymer adsorbed thereon.

Dispersion Containing Photocatalyst Composite Particles Dispersed in Solvent

The photocatalyst composite particles of the present invention exhibits high dispersion stability in a solvent. Therefore, the photocatalyst composite particles of the present invention can be dispersed stably in a solvent, and a dispersion in which the photocatalyst composite particles are uniformly dispersed can be obtained.

A concentration at which the photocatalyst composite particles of the present invention exhibit high dispersibility in a solvent is preferably 0.0001% by mass or more to 50% by mass or less, more preferably 0.001% by mass or more to 30% by mass or less, and even more preferably 0.01% by mass or more to 20% by mass or less. Furthermore, a range of pH of the solvent at which the photocatalyst composite particles of the present invention exhibit high dispersibility is preferably 1 or more to 13 or less, more preferably 3 or more to 12 or less, and even more preferably 4 or more to 11 or less.

In the present invention, a surface zeta potential of a dispersion of the photocatalyst composite particles in pure water with the concentration of the photocatalyst composite particles being 1% by mass, is preferably −30 mV or less, more preferably −40 mV or less, and even more preferably −50 mV or less. Here, the zeta potential can be obtained by measuring a dispersion by using a dynamic light scattering-type particle size analyzer (for example, ELSZ-1000 manufactured by Otsuka Electronics Co., Ltd.), the dispersion being obtained by mixing the photocatalyst composite particles and pure water so that a concentration becomes 1% by mass. The pure water refers to water having electrical conductivity of 1 mS/m or less, and distilled water and ultrapure water can be used.

Reaction of Splitting Water Using Photocatalyst Composite Particles

The photocatalyst composite particles of the present invention exhibit high activity in the reaction of splitting water under visible light irradiation. Due to the presence of the hydrophilic phosphoric acid polymer on the surface, the photocatalyst composite particles have very high wettability with water as a reaction object. The phosphoric acid polymer is not easily reduced or oxidized by electron or hole generated by photoexcitation. Therefore, the photocatalyst composite particles of the present invention can, even under a long-term light irradiation, maintain wettability with water for a long period of time and accomplish a stable reaction of splitting water.

Method for Producing Photocatalyst Particles

As a method for producing the photocatalyst particles in the present invention, a method is suitably used, in which the photocatalyst particles are obtained by nitridization of a desired metal or a precursor comprising at least one selected from oxides, hydroxides, and carbonates containing the desired metal. The method for nitridization specifically includes a method of firing the metal or the precursor in an ammonia atmosphere at a temperature of 500° C. or more.

Method for Producing Precursor

As a method for producing the precursor comprising oxides or hydroxides containing the desired metal, a wet reaction method and a flux method which enables crystal growth in a high-temperature fluxing agent can be used. The wet reaction method includes a sol-gel method, a complex polymerization method, a hydrothermal reaction method, and the like. For example, as a preparation method by the sol-gel method, there is a method comprising: generating a hydroxide containing a metal by a hydrolysis reaction between a metal alkoxide or a metal chloride as a raw material, and water; and firing the hydroxide at 600° C. or more for crystallization.

As a method for producing the precursor comprising an oxide containing the desired metal, a thermal decomposition method using an aqueous solution containing the desired metal, that is, aqueous solution thermal decomposition method can be used. The aqueous solution thermal decomposition method is a method in which by heating an aqueous solution containing a water-soluble metal complex, water as a solvent is evaporated thereby triggering a dehydration polycondensation reaction among the metal complexes, followed by firing to obtain crystallized particles. In this method, since a metal complex having a mild hydrolysis reaction rate is used as the raw material, the metal complex can be stably dissolved in water. By heating the aqueous solution containing the metal complex which can be stably dissolved in water, with evaporation of water as the solvent, the dehydration polycondensation reaction among the metal complexes occurs mildly. It is considered that, due to combination with a water-dispersible organic polymer particles, the generation speed of crystal nuclei during the thermal decomposition is slow, and as a result, an advantage that crystals can be refined is obtained.

As a specific method of the aqueous solution thermal decomposition method, for example, the following method may be mentioned. First, an aqueous solution containing a water-soluble metal complex is prepared by mixing a compound containing a desired metal and a hydrophobic complexing agent together to prepare a mixture and dissolving the mixture in water. Here, a hydrophilic complexing agent may be mixed for a purpose of suppressing a hydrolysis reaction of and improving solubility of the compound containing the desired metal. Thereafter, water dispersible organic polymer particles are added to the aqueous solution containing a water-soluble metal complex to obtain a dispersion. By heating and crystallizing this dispersion, a precursor comprising an oxide containing the desired metal is obtained. As an example of more specific method of the aqueous solution thermal decomposition method, a precursor can be obtained by using a method described in WO 2013/180307.

Method for Producing Photocatalyst Composite Particles

As a method for producing the photocatalyst composite particles in the present invention, a method of dry mixing or wet mixing the photocatalyst particles and a phosphoric acid polymer can be mentioned. The method of dry mixing includes a method of dry mixing the photocatalyst particles and the phosphoric acid polymer as powder, and a method of vapor depositing the phosphoric acid polymer on the surface of the photocatalyst particles by a chemical vapor deposition (CVD) method and the like. In the present invention, it is preferable to produce the photocatalyst composite particles by using the wet mixing. Specifically, a method of mixing at least the photocatalyst particles, the phosphoric acid polymer, and a solvent without using dispersion media such as balls, beads, and the like can be suitably used. Hereby, a dispersion having the photocatalyst composite particles dispersed in a solvent can be obtained. By separating the solvent from this dispersion, the photocatalyst composite particles can be obtained. A method for separating the solvent includes drying by heating, centrifugation, filtration, and the like. The method of mixing preferably includes stirring, shaking using a shaker, ultrasonic irradiation, and the like. More preferable method among them is stirring. Stirring is preferably performed by using a stirring bar, a stirring blade(s), and the like. This can improve dispersibility of the photocatalyst composite particles. The reason for this is as follows. When the photocatalyst particles are forming secondary particles, the phosphoric acid polymer gradually diffuses into the inside of the secondary particles, and adsorbs on the surface of primary particles which constitute the secondary particles. Hereby, the solvent permeates into the inside of the secondary particles, that is, into the gaps between the primary particles. As a result, it is considered that a state can be formed, in which the surface of the primary particles is easily wetted by the solvent. Also, the phosphoric acid polymer can be adsorbed on the surface of the photocatalyst particles as a monomolecular layer. Furthermore, because stirring rarely causes mechanical and sharp collisions of particles with each other, formation of surface defects of the photocatalyst composite particles can be suppressed, and photocatalytic activity possessed by the photocatalyst particles can be maintained.

On the other hand, when a solution containing at least the photocatalyst particles and the phosphoric acid polymer is mixed by using dispersion media such as balls, beads, or the like, the dispersion media repeat mechanical collision with the surface of the photocatalyst particles. Hereby, the surface of the photocatalyst particles is oxidized, and nitrogen ions ($N^{3-}$) which exist in the vicinity of the surface of the photocatalyst particles are released as $N_2$. From the above, there is a possibility that nitrogen ion sites of the photocatalytic particles are substituted with oxygen ions, or crystal defects of the photocatalyst particles are generated in large numbers. Furthermore, when such an oxidation reaction occurs on the surface of the photocatalyst particles, stoichiometric ratios of nitrogen and oxygen inside and on the surface of the photocatalyst particles vary. For example, when nitrogen ions on the surface of the photocatalyst particles decrease, the position of a valence band, in which orbitals derived from nitrogen are involved, changes, causing a possibility that generation of electron-hole pairs depending on visible light responsiveness and visible light excitation deteriorates extremely. Therefore, it is preferable to mix a solution containing at least the photocatalyst particles and the phosphoric acid polymer without using dispersion media such as balls, beads, or the like.

Method for Producing Dispersion

In the present invention, as mentioned above, a dispersion in which the photocatalyst composite particles are dispersed can be obtained by mixing at least the photocatalyst particles, the phosphoric acid polymer, and a solvent. The solvent may be one in which the photocatalyst composite particles can be dispersed. Specifically, it is preferable to use one or more selected from the group consisting of water, methanol, ethanol, isopropyl alcohol, n-propyl alcohol, ethylene glycol, cellosolve solvents such as methyl cellosolve, ethyl cellosolve, and the like, carbitol solvents such as ethyl carbitol, butyl carbitol, and the like, dimethyl sulfoxide, acetonitrile, acetone, and dimethyl formamide. More preferable are highly polar solvents having a dielectric constant of 25 or more at room temperature, and are one or more selected from the group consisting of water, methanol, ethylene glycol, cellosolve solvents such as methyl cellosolve, ethyl cellosolve, and the like, carbitol solvents such as ethyl carbitol, butyl carbitol, and the like, dimethyl sulfoxide, acetonitrile, and dimethyl formamide. Hereby, interaction with phosphate groups having high polarity can be increased. More preferable is water. As a mixing method, the same methods as those described above can be used. Further, a dispersion can also be obtained by separating the photocatalyst composite particles from the dispersion by using a method such as centrifugation, filtration, and the like, and dispersing the photocatalyst composite particles again in a different solvent by using the above-mentioned mixing methods.

Photocatalytic Member

The photocatalyst composite particles of the present invention can be used as a photocatalytic member by fixing the particles onto a substrate. Hereby, when visible light such as sunlight is irradiated to the photocatalytic member, the member can stably split water for a long period of time to generate hydrogen and/or oxygen. In the present invention, the photocatalyst composite particles are fixed onto the substrate through, for example, the phosphate groups contained in the phosphoric acid polymer by ester bonds. In addition, a method also can be suitably used, in which positive charges are imparted to the substrate, and the photocatalyst composite particles are fixed onto the substrate by ionic bonds, namely electrostatic absorption, using Coulomb interaction. Specifically, a method may be mentioned in which the photocatalyst composite particles are fixed onto the substrate under conditions that zeta potential on the surface of the substrate is sufficiently positively charged and that the surface of the photocatalyst particles is negatively charged. Even when positive charges are not imparted to the surface of the substrate, the photocatalyst composite particles can be suitably fixed onto the substrate by ester bonds.

As the substrate, alumina and zirconia which, as solid bases, are easy to generate positive charges on the surface; a substrate, on the surface of which is introduced a polymeric compound or an inorganic compound having positive charges; and the like can suitably be used. A substrate, which has no positive charge or does not have positive charges in a sufficient amount, is usable by introducing a polymeric compound or an inorganic compound having positive charges on the surface of the substrate. In this case, glass such as soda lime glass or borosilicate glass; quartz; an inorganic oxide such as aluminum oxide, i.e., alumina or the like; or a metal such as titanium, aluminum, iron, stainless steel, or the like is used as the substrate. As the polymeric compound having positive charges, at least one selected from the group consisting of polyethylene imine, polyallyl amine, polydimethyldiallylammonium, and polyacrylamide, as well as substitution products and salts thereof, and the like can be suitably used. As the inorganic compound having positive charges, at least one selected from hydroxides or oxides containing aluminum, magnesium, zirconium, and the like can be suitably used. As a method for introducing the polymeric compound or inorganic compound having positive charges onto the substrate, there can be suitably used an adsorption method where the substrate is immersed in a solution in which the polymeric compound or inorganic compound having positive charges is dissolved, or methods of coating the substrate with a solution in which the polymeric compound or the inorganic compound having positive charges is dissolved, which include a spin coating method, a dip coating method, a doctor blade method, a squeegee method, a screen printing method, and the like.

As a method for providing the substrate with positive charges, a method for forcibly generating positive charges on the surface of the substrate by an external electric field by using an electrophoresis method and the like can also be used. In this case, the photocatalyst composite particles can be fixed on the surface of the substrate by migrating the photocatalyst composite particles having negative charges on the surface thereof in a solvent.

When a substrate having conductivity is used, the photocatalyst composite particles may be fixed on the substrate by formation of ester bonds between metal ions present on the surface of the conductive substrate and phosphate groups of the phosphoric acid polymer on the surface of the photocatalyst composite particles. In this case, the photocatalyst composite particles can be firmly fixed on the substrate. The photocatalytic member obtained can be used as an electrode, namely cathode or anode. Hereby, hydrogen or oxygen can be generated by photoelectrochemically splitting water. As a substrate having conductivity, preferable is one having conductivity of 1 S/cm or more. Specifically, there may be mentioned conductive oxide materials such as tin-doped indium oxide (ITO), fluorine-doped tin oxide (FTO), aluminum-doped zinc oxide (AZO), boron-doped zinc oxide (BZO), iridium oxide, ruthenium oxide, and the like; and metals such as at least one selected from the group consisting of titanium, niobium, tantalum, tin, tungsten, zirconium, indium, copper, and zinc.

A shape of the substrate may be such that the photocatalyst composite particles can be fixed onto the substrate. A flat plate having a smooth surface such as a glass substrate, an alumina substrate, or the like; a flat plate having a porous surface such as anodized alumina; a porous body such as porous ceramics: a fiber body such as glass fiber or carbon fiber; or the like is preferably used, but not limited thereto. As the fiber body, glass fibers having high light transmissivity are more preferably used. Hereby, transmission of light inside the fiber body becomes possible rather than on the light irradiation surface of the fiber body, thereby promising an increase in light absorption amount.

Method for Producing Photocatalytic Member

In the present invention, the photocatalytic member can be obtained by applying a dispersion, containing the photocatalyst composite particles dispersed in a solvent, onto the surface of a substrate and by fixing the photocatalyst composite particles on the substrate. For example, the photocatalytic member is obtained by using a substrate provided with positive charges or a substrate containing metal on the surface thereof, the metal being capable of forming ester bonds with phosphate groups, and by applying a dispersion, containing the photocatalyst composite particles dispersed in a solvent, onto the surface of the substrate. Methods for applying a dispersion on the surface of the substrate include a method of coating the substrate with the dispersion, and a method of immersing the substrate in the dispersion. As the coating method, a spin coating method, a dip coating method, a doctor blade method, a squeegee method, a screen printing method, and the like can be used.

In order to firmly fix the photocatalyst composite particles on the substrate, the substrate with the photocatalyst composite particles fixed thereon may be dried and/or fired. By drying and/or firing, a photocatalytic member can be obtained having high adhesion between the photocatalyst composite particles and the substrate, high bindability among the particles, and long-term stability. The temperature for firing is preferably 50° C. or more to 700° C. or less, more preferably 150° C. or more to 600° C. or less, and even more preferably 250° C. or more to 500° C. or less. Within this range of temperature, deterioration of activity due to oxidation or denaturation of the photocatalyst particles can be suppressed. As an atmosphere of firing, air; inert gas such as nitrogen, argon, or vacuum; ammonia; or the like can be used. Firing in an air atmosphere enables fixation at a low cost. Firing in an inert gas atmosphere or an ammonia atmosphere enables suppression of deterioration of activity due to oxidation or denaturation of the photocatalyst particles.

Photocatalytic Module for Splitting Water

The photocatalytic module for splitting water of the present invention comprises the photocatalytic member. In a preferred embodiment of the present invention, the photocatalytic module for splitting water according to the present invention has a nearly transparent light incident surface and is structured such that light is incident on the photocatalytic member disposed within the module. In addition, the photocatalytic module has a sealed panel configuration for containing water so that the photocatalytic member can be always in contact with water. In a more preferred embodiment of the present invention, the photocatalytic module for splitting water according to the present invention further comprises a mechanism such as a water passing hole through which water, the amount of which is reduced with the progress of the water-splitting reaction, can be successively and additionally supplied. The photocatalytic module for splitting water having the above construction allows commercially available production of hydrogen.

System for Producing Hydrogen

The system for producing hydrogen of the present invention comprises the photocatalytic module for splitting water. In a preferred embodiment of the present invention, the system for producing hydrogen of the present invention comprises a water supply apparatus, a filtration apparatus for removing impurities contained in water to some extent, a photocatalytic module for splitting water, a hydrogen separation apparatus, and a hydrogen storage apparatus. The hydrogen production system having the above construction allows production of hydrogen from sunlight and water as a renewable energy source.

EXAMPLES

The present invention will be explained in more detail by the following Examples. The scope of the present invention however is not limited to these Examples.

Preparation of Metal Oxynitride Photocatalyst Particles 1 (LaTiO$_2$N)

3.26 g (0.01 mol) of La$_2$O$_3$ (Wako Pure Chemical Industries, Ltd.) and 0.80 g (0.01 mol) of TiO$_2$ (rutile type, Wako Pure Chemical Industries, Ltd.) were kneaded by using a mortar for 5 minutes, followed by being mixed uniformly to obtain mixed powder. Thereafter, 4.06 g of powder, obtained by mixing NaCl (Wako Pure Chemical Industries, Ltd.) and KCl (Wako Pure Chemical Industries, Ltd.) in equimolar amounts, was added to the mixed powder. Thereafter, 5 g of distilled water was added thereto, and the mixture was kneaded by using a mortar until the distilled water was sufficiently evaporated to obtain raw material powder for flux synthesis. Subsequently, the raw material powder for flux synthesis was placed in an alumina crucible, the crucible being then lidded. Thereafter, the temperature was raised at 10° C./minute and was maintained at 1000° C. for 5 hours. Thereafter, the crucible was cooled naturally to obtain powder of La$_2$Ti$_2$O$_7$ by a flux synthesis method.

1 g of La$_2$Ti$_2$O$_7$ powder obtained was nitrided by annealing it in an ammonia flux (250 mL/minute) at 950° C. for 15 hours to obtain LaTiO$_2$N powder. When this LaTiO$_2$N powder was observed by using a scanning electron microscope (SU-8020 manufactured by Hitachi High-Technologies Corporation) at a magnification of 20000 times, an average primary particle diameter was 250 nm. The average primary particle diameter is an average value of diameters of 50 crystal particles, the diameters being approximated by a circle.

Preparation of Metal Oxynitride Photocatalyst Particles 2 (SrNbO$_2$N)

0.02 mol of niobium pentaethoxide (Wako Pure Chemical Industries, Ltd.) was added to a 10-mL sample tubular bottle, and 0.02 mol of acetylacetone (Wako Pure Chemical Industries, Ltd.) was added thereto dropwise with stirring over 1 minute to obtain a yellow solution containing a niobium-aceteylacetone complex. This yellow solution was added dropwise to 50 mL of distilled water containing 0.01 mol of lactic acid (Wako Pure Chemical Industries, Ltd.) dissolved therein over 1 minute, and the mixture was stirred at room temperature for 30 minutes to prepare an aqueous solution of a water-soluble niobium complex. To this aqueous solution of a water-soluble niobium complex was added dropwise 5 mL of distilled water containing 0.01 mol of strontium acetate 0.5 hydrate (Wako Pure Chemical Industries, Ltd.) dissolved therein over 1 minute to prepare an aqueous solution of a Sr$_2$Nb$_2$O$_7$ precursor. To the aqueous precursor solution, an acryl-styrene-based 0/W type emulsion (manufactured by DIC, EC-905EF, dispersed particle diameter of 100 to 150 nm, pH: 7 to 9, solid content of 49 to 51%) was added to prepare a dispersion, the emulsion being added so that its solid content was 5 times as much as that of Sr$_2$Nb$_2$O$_7$ obtained after firing in terms of weight ratio. This dispersion was dried at 80° C. for 1 hour, and then, the dried product was fired at 800° C. for 5 hours, and then, the fired product was crystallized at high temperature to obtain powder comprising Sr$_2$Nb$_2$O$_7$ particles.

1 g of Sr$_2$Nb$_2$O$_7$ powder obtained was nitrided by annealing it in an ammonia flux (250 mL/minute) at 850° C. for 15 hours to obtain SrNbO$_2$ powder. This SrNbO$_2$ powder was observed by a scanning electron microscope (SU-8020 manufactured by Hitachi High-Technologies Corporation), and an average primary particle diameter was obtained by the method described above. The average primary particle diameter was 200 nm.

Preparation of Metal Nitride Photocatalyst Particles 3 (Ta$_3$N$_5$)

0.002 mol of tantalum pentaethoxide (Wako Pure Chemical Industries, Ltd.) was added to a 10-mL sample tubular bottle, and 0.002 mol of acetylacetone (Wako Pure Chemical Industries, Ltd.) was added thereto dropwise with stirring over 1 minute to obtain a yellow solution containing a tantalum-aceteylacetone complex. This yellow solution was added dropwise to 5 mL of distilled water containing 0.001 mol of acetic anhydride (Wako Pure Chemical Industries, Ltd.) and 0.006 mol of citric acid 1-hydrate (Wako Pure Chemical Industries, Ltd.) dissolved therein over 1 minute, and the mixture was stirred at room temperature for 30 minutes to prepare an aqueous solution of a water-soluble tantalum complex. To the aqueous solution of a water-soluble tantalum complex, an acryl-styrene-based 0/W type emulsion (manufactured by DIC, EC-905EF, dispersed particle diameter of 100 to 150 nm, pH: 7 to 9, solid content of 49 to 51%) was added to prepare a dispersion, the emulsion being added so that its solid content was 5 times as much as that of Ta$_2$O$_5$ obtained after firing in terms of weight ratio. This dispersion was dried at 80° C. for 1 hour, and then, the dried product was fired at 800° C. for 5 hours, and then, the fired product was crystallized at high temperature to obtain powder comprising Ta$_2$O$_5$ particles.

1 g of Ta$_2$O$_5$ powder obtained was nitrided by annealing it in an ammonia flux (500 mL/minute) at 900° C. for 30 hours to obtain Ta$_3$N$_5$ powder. This Ta$_3$N$_5$ powder was observed by a scanning electron microscope (SU-8020 manufactured by Hitachi High-Technologies Corporation), and an average primary particle diameter was obtained by the method described above. The average primary particle diameter was 200 nm.

Preparation of Photocatalyst Composite Particles

Examples 1 to 10

The photocatalyst particles 1 to 3, a phosphoric acid polymer shown in Table 1, and water were mixed in a blending ratio shown in Table 1 to obtain a mixture. This mixture was stirred at room temperature for 3 days with a stirrer to prepare a dispersion containing the photocatalyst composite particles dispersed therein.

Comparative Examples 1, 3, and 5

The photocatalyst particles 1 to 3, and water were mixed in a blending ratio shown in Table 1 to obtain a mixture. This mixture was stirred at room temperature for 3 days with a stirrer to prepare a dispersion containing the photocatalyst particles dispersed therein.

Comparative Examples 2 and 4

The photocatalyst particles 1 and 2, and water were mixed in a blending ratio shown in Table 1 to obtain a mixture. This mixture was stirred at room temperature for 3 days with a stirrer. Subsequently, the mixture was added to a 50-mL polyethylene bottle containing 5 g of 1 mmφ zirconia beads, and was subjected to ball mill processing for 15 hours to prepare a dispersion containing the photocatalyst particles dispersed therein.

Evaluation of Dispersibility

Dispersibility of the dispersions obtained was evaluated. The evaluation was made as follows. After stirring, when all particles were precipitated within 5 hours by visual inspection, dispersibility was evaluated as x. When no particle was precipitated under the same conditions as above, dispersibility was evaluated as ○. The results are shown in Table 1.

Measurement of Average Particle Diameter and Surface Zeta Potential

The dispersion obtained was adjusted so that its concentration of photocatalyst composite particles was 1% by mass and its pH was 8. The dispersion thus adjusted was evaluated by using a dynamic light scattering-type particle size analyzer (ELSZ-1000 manufactured by Otsuka Electronics Co., Ltd.), and an average particle diameter and surface zeta potential of the photocatalyst composite particles were measured from the scattering intensity distribution obtained by a Cumulant method. The results are shown in Table 1. As a result, the average primary particle diameter from SEM observation and the average particle diameter from the Cumulant method were generally the same. Furthermore, it was confirmed that the photocatalyst composite particles were in a nearly monodisperse state in the dispersion.

Evaluation of $A_{surface}/A_{bulk}$ of Photocatalyst Composite Particles

By XPS measurement, $A_{surface}/A_{bulk}$ of the photocatalyst composite particles and photocatalyst particles prepared were evaluated. As a apparatus, PHI Quantera II (manufactured by ULVAC-PHI, Inc., X-ray source: monochromatic Al K$\alpha$ (1486.6 eV)) was used.

Dispersions of Examples and Comparative Examples were centrifuged (6000 rpm, 5 minutes) to obtain precipitates. By using powder obtained by drying the precipitate at 100° C. for 30 minutes, $A_{surface}/A_{bulk}$ was evaluated.

Concentration (atm %) of elements on the surface of the photocatalyst composite particles or the photocatalyst particles was measured by performing XPS analysis (analysis depth of 2 to 3 nm) of powder of the photocatalyst composite particles or the photocatalyst particles collected from the dispersion, and thereby performing elemental analysis in a region of a depth of 2 to 3 nm from the surface of the photocatalyst composite particles or the photocatalyst particles. Concentration (atm %) of elements inside the photocatalyst composite particles or the photocatalyst particles was measured by etching elements on the surface of powder with an Ar ion etching treatment and by performing elemental analysis in a region of a depth of about 10 nm from the surface of the photocatalyst composite particles or the photocatalyst particles. The concentration of each element thus obtained is shown in Table 2 and Table 3.

From the concentration of each element obtained, $A_{surface}$, $A_{bulk}$, and $A_{surface}/A_{bulk}$, a ratio thereof, were determined. The results are shown in Table 2 and Table 3. As the concentration of oxygen atom, integrated intensity of a peak (pK 1 (O-metal), binding energy: 529.3 eV) derived from an oxygen atom bound to a metal element was used. As the concentration of nitrogen atom, integrated intensity of a peak (pK 1, binding energy: 395.2 eV) derived from a nitrogen atom bound to a metal element was used.

As a result, in Examples, the values of $A_{surface}$ and $A_{bulk}$, that is, nitrogen contents on the surface and inside the photocatalyst composite particles were nearly the same. Therefore, it was confirmed that generation of crystal defects did not occur. On the other hand, in Comparative Examples 2 and 4 in which ball mill processing was performed, the values of $A_{surface}/A_{bulk}$ were less than 0.8, and the nitrogen content on the surface of the photocatalyst particles was less than the nitrogen content inside the photocatalyst particles. Therefore, it was suggested that generation of crystal defects occurred in Comparative Examples 2 and 4.

Evaluation of Photocatalytic Activity of Photocatalyst Composite Particles

Precipitates obtained by centrifugation (6000 rpm, 5 minutes) of dispersions prepared in Example 10 and Comparative Example 5 were dried at 100° C. for 30 minutes, and thereby, photocatalyst composite particles and photocatalytic particles were obtained. Water splitting activity of these particles under visible light irradiation was investigated by the following method. 0.05 g of $Ta_3N_5$ powder, and 100 ml of an aqueous solution containing 50 mmol/L of silver nitrate (Wako Pure Chemical Industries, Ltd.) as a sacrificial reagent and 50 mmol/L of $Ta_2O_3$ powder (Wako Pure Chemical Industries, Ltd.) as a pH buffer were introduced into a glass flask with a Pyrex® window for upper part irradiation, and the mixture was stirred with a stirrer to obtain a reaction solution. Next, the glass flask containing this reaction solution was mounted on a closed circulation apparatus (manufactured by Makuhari Rikagaku Garasu Inc.). The atmosphere inside the reaction system was purged with argon. Then, visible light by a 300-W xenon lamp (manufactured by Cermax, PE-300BF) equipped with a UV cutoff filter (L-42, manufactured by HOYA) was irradiated to the object through a Pyrex® window. The amount of oxygen generated as a result of oxidation of water was measured for 3 hours after the start of the irradiation by using a gas chromatograph (manufactured by Shimadzu Seisakusho Ltd., GC-8A, TCD detector, MS-5A column).

As a result, an amount of oxygen generated for 1 hour after the start of the visible light irradiation on the photocatalyst composite particles of Example 10 was 11.82 μmol. An amount of oxygen generated for 1 hour after the start of the visible light irradiation on the photocatalyst particles of Comparative Example 5 was 11.17 μmol. From these, the photocatalyst composite particles of Example 10 had better photocatalytic activity than the photocatalyst particles of Comparative Example 5, and, even when the photocatalyst particles were adsorbed the phosphoric acid polymer on the surface thereof, the photocatalytic activity of Example 10 did not deteriorate. Furthermore, it became clear that the photocatalyst composite particles were able to maintain high dispersibility.

Preparation of Photocatalytic Member

By using a dispersion prepared in Example 9, photocatalyst composite particles were fixed on the surface of a glass substrate. Fixation was performed as follows. First, the surface of borosilicate glass (10×10×1 mm thickness) was cleaned, and thereafter, the surface was treated with spin coating (5000 rpm, 20 seconds) by using a 0.25% by mass aqueous solution containing polyethyleneimine (Wako Pure Chemical Industries, Ltd.) dissolved therein to prepare a glass substrate provided with positive charges. Next, this substrate was immersed in a dispersion of $SrNbO_2N$ in tripolyphophoric acid at room temperature for 1 hour, and thereafter, was washed with distilled water to obtain a photocatalytic member.

When the surface of the photocatalytic member obtained was observed by SEM, it was confirmed that $SrNbO_2N$ particles with tripolyphosphoric acid adsorbed thereon were fixed on the surface of the substrate. Further, it was confirmed that 70% of the area of the substrate surface was covered mostly with a monolayer. On the other hand, when the surface of the photocatalytic member obtained by performing the same procedures on a glass substrate, which was not provided with positive charges, was observed by SEM, it was confirmed that $SrNbO_2N$ particles with tripolyphosphoric acid adsorbed thereon were scarcely adsorbed, that is, were not able to be fixed on the surface of the substrate.

TABLE 1

| Sample | Photocatalyst particles Type | Photocatalyst particles Weight (mg) | Phosphoric acid polymer Type | Phosphoric acid polymer Weight (mg) | Solvent (water) Volume (mL) | Evaluation Average particle diameter (nm) | Evaluation Zeta potential (mV) | Dispersibility |
|---|---|---|---|---|---|---|---|---|
| Example 1 | 1(LaTiO$_2$N) | 10 | Sodium tripolyphosphate | 0.1 | 1 | 291 | −51.34 | ○ |
| Example 2 | 1(LaTiO$_2$N) | 10 | Sodium tripolyphosphate | 0.5 | 1 | 284 | −63.81 | ○ |
| Example 3 | 1(LaTiO$_2$N) | 10 | Sodium tripolyphosphate | 1 | 1 | 322 | −69.21 | ○ |
| Example 4 | 1(LaTiO$_2$N) | 10 | Sodium tripolyphosphate | 5 | 1 | 297 | −60.26 | ○ |
| Example 5 | 1(LaTiO$_2$N) | 10 | Sodium hexametaphosphate | 0.1 | 1 | 293 | −52.6 | ○ |
| Example 6 | 1(LaTiO$_2$N) | 10 | Sodium hexametaphosphate | 0.5 | 1 | 291 | −60.38 | ○ |
| Example 7 | 1(LaTiO$_2$N) | 10 | Sodium hexametaphosphate | 1 | 1 | 272 | −60.37 | ○ |
| Example 8 | 1(LaTiO$_2$N) | 10 | Sodium hexametaphosphate | 5 | 1 | 270 | −66.01 | ○ |
| Comparative Example 1 | 1(LaTiO$_2$N) | 10 | | 0 | 1 | 1492 | −5.37 | × |
| Comparative Example 2 | 1(LaTiO$_2$N) | 10 | | 0 | 1 | 549 | | × |
| Example 9 | 2(SrNbO$_2$N) | 10 | Sodium tripolyphosphate | 1 | 1 | 173 | | ○ |
| Comparative Example 3 | 2(SrNbO$_2$N) | 10 | | 0 | 1 | 1019 | | × |
| Comparative Example 4 | 2(SrNbO$_2$N) | 10 | | 0 | 1 | 647 | | × |
| Example 10 | 3(Ta$_3$N$_5$) | 10 | Sodium tripolyphosphate | 1 | 1 | 297 | | ○ |
| Comparative Example 5 | 3(Ta$_3$N$_5$) | 10 | | 0 | 1 | 2114 | | × |

TABLE 2

| Sample | | C | O pK1 (O-metal) | O pK2(O=C) pK3(O—C) | Na | La | Ti | P | A$_{surface}$ | A$_{bulk}$ | A$_{surface}$/A$_{bulk}$ |
|---|---|---|---|---|---|---|---|---|---|---|---|
| Example 6 | Surface | 23.3 | 21.2 | 21.3 | 6.5 | 9.0 | 8.9 | 9.8 | 0.23 | 0.24 | 0.96 |
| | Inside | 29.1 | 16.6 | 24.6 | 5.3 | 9.5 | 9.0 | 5.9 | | | |
| Comparative Example 1 | Surface | 31.7 | 23.3 | 19.6 | 5.9 | 9.9 | 9.7 | 0.0 | 0.20 | 0.22 | 0.91 |
| | Inside | 24.8 | 28.9 | 14.3 | 8.3 | 12.5 | 11.2 | 0.0 | | | |
| Comparative Example 2 | Surface | 42.5 | 24.7 | 14.6 | 3.7 | 7.2 | 7.3 | 0.0 | 0.13 | 0.19 | 0.70 |
| | Inside | 37.4 | 16.0 | 23.3 | 3.7 | 7.0 | 7.5 | 0.0 | | | |

TABLE 3

| Sample | | C | O pK1 (O-metal) | O pK2(O=C) pK3(O—C) | Na | La | Ti | P | A$_{surface}$ | A$_{bulk}$ | A$_{surface}$/A$_{bulk}$ |
|---|---|---|---|---|---|---|---|---|---|---|---|
| Example 9 | Surface | 28.0 | 23.1 | 16.3 | 6.4 | 10.9 | 10.3 | 3.0 | 0.22 | 0.23 | 0.93 |
| | Inside | 17.3 | 27.5 | 14.7 | 8.4 | 14.7 | 17.1 | 0.3 | | | |
| Comparative Example 3 | Surface | 63.8 | 9.6 | 17.1 | 2.3 | 3.5 | 3.2 | 0.0 | 0.19 | 0.20 | 0.97 |
| | Inside | 38.0 | 16.0 | 29.1 | 4.0 | 6.2 | 6.7 | 0.0 | | | |
| Comparative Example 4 | Surface | 33.1 | 17.7 | 23.9 | 3.5 | 10.6 | 10.3 | 0.0 | 0.17 | 0.27 | 0.61 |
| | Inside | 21.7 | 14.7 | 14.7 | 5.4 | 14.4 | 17.1 | 0.0 | | | |

What is claimed is:

1. Photocatalyst composite particles comprising:
   metal nitride photocatalyst particles and/or metal oxynitride photocatalyst particles, which are capable of splitting water under visible light irradiation, and
   a phosphoric acid polymer which is adsorbed on the surface of the particles,
   wherein a ratio of A$_{surface}$/A$_{bulk}$ is 0.8 or more to 1.2 or less, where A$_{surface}$ is an atomic concentration ratio on the surface of the photocatalyst composite particles, and is represented by (nitrogen atom concentration)/(nitrogen atom concentration+oxygen atom concentration), and A$_{bulk}$ is an atomic concentration ratio inside the photocatalyst composite particles, and is represented by (nitrogen atom concentration)/(nitrogen atom concentration+oxygen atom concentration).

2. The photocatalyst composite particles according to claim 1, wherein a weight ratio of the metal nitride photocatalyst particles and/or metal oxynitride photocatalyst particles to the phosphoric acid polymer is 1:0.005 or more to 1:0.3 or less.

3. The photocatalyst composite particles according to claim 1, wherein the photocatalyst composite particles support a co-catalyst.

4. The photocatalyst composite particles according to claim 1, wherein the photocatalyst composite particles are used for splitting water with visible light.

5. A method for splitting water, wherein the photocatalyst composite particles according to claim 1 being in contact with water are irradiated with visible light.

6. A dispersion comprising:
the photocatalyst composite particles according to claim 1 and
a solvent capable of dispersing the photocatalyst composite particles.

7. A photocatalytic member comprising:
a substrate and
the photocatalyst composite particles according to claim 1 being fixed on the surface of the substrate.

8. The photocatalytic member according to claim 7, wherein the photocatalyst composite particles are fixed on the surface of the substrate by phosphate groups contained in the phosphoric acid polymer.

9. The photocatalytic member according to claim 7, wherein the photocatalyst composite particles are fixed on the surface of the substrate by ionic bonds or ester bonds through the phosphate groups.

10. The photocatalytic member according to claim 7, wherein the photocatalytic member is used for splitting water with visible light.

11. A photocatalytic module for splitting water comprising the photocatalytic member according to claim 7.

12. A hydrogen producing system comprising the photocatalytic module for splitting water according to claim 11.

13. The method for producing the photocatalytic member according to claim 7, comprising applying a dispersion comprising the photocatalyst composite particles and a solvent capable of dispersing the photocatalyst composite particles to the surface of the substrate.

14. A method for producing the photocatalyst composite particles according to claim 1, comprising mixing metal nitride photocatalyst particles and/or metal oxynitride photocatalyst particles, a phosphoric acid polymer, and a solvent without using dispersion media.

15. The method for producing the photocatalyst composite particles according to claim 14, wherein the method of mixing is stirring.

16. The photocatalyst composite particles according to claim 1, wherein a surface zeta potential of a dispersion of the photocatalyst composite particles in pure water with the concentration of the photocatalyst composite particles being 1% by mass, is −30 mV or less.

17. The photocatalyst composite particles according to claim 16, wherein a weight ratio of the metal nitride photocatalyst particles and/or metal oxynitride photocatalyst particles to the phosphoric acid polymer is 1:0.005 or more to 1:0.3 or less.

18. The photocatalyst composite particles according to claim 16, wherein the photocatalyst composite particles support a co-catalyst.

19. A dispersion comprising:
the photocatalyst composite particles according to claim 16 and
a solvent capable of dispersing the photocatalyst composite particles.

20. A photocatalytic member comprising:
a substrate and
the photocatalyst composite particles according to claim 16 being fixed on the surface of the substrate.

* * * * *